D. Y. MOSBY.
ANIMAL TRAP.
APPLICATION FILED APR. 29, 1919.
1,359,724.
Patented Nov. 23, 1920.
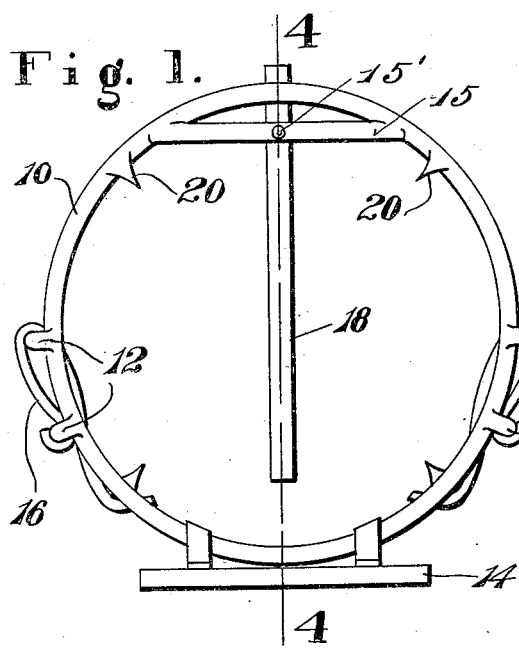
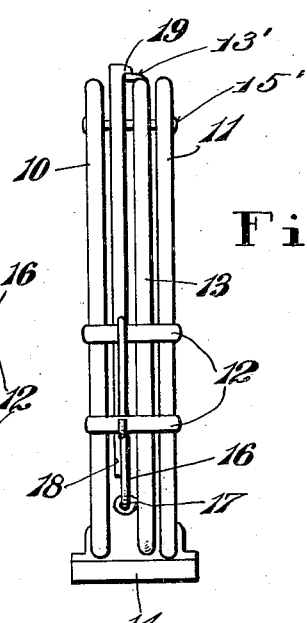
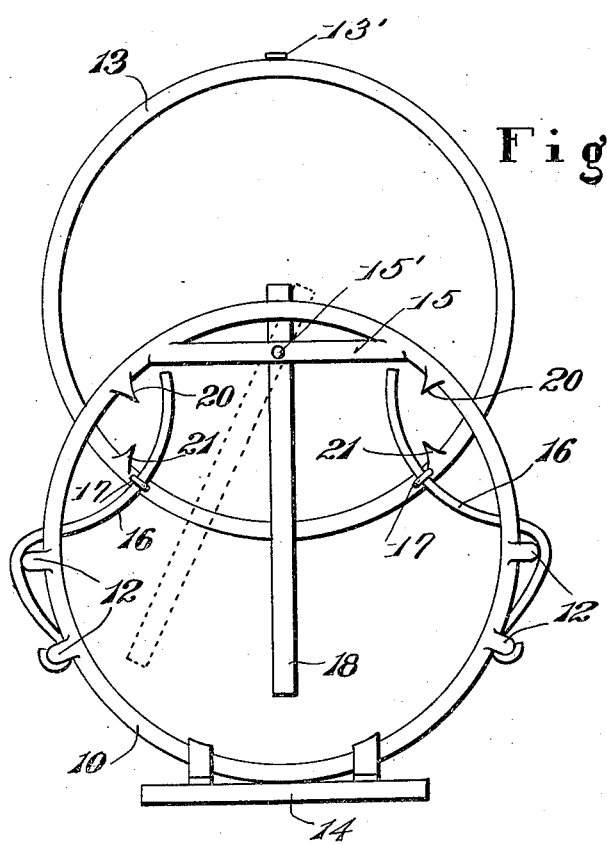
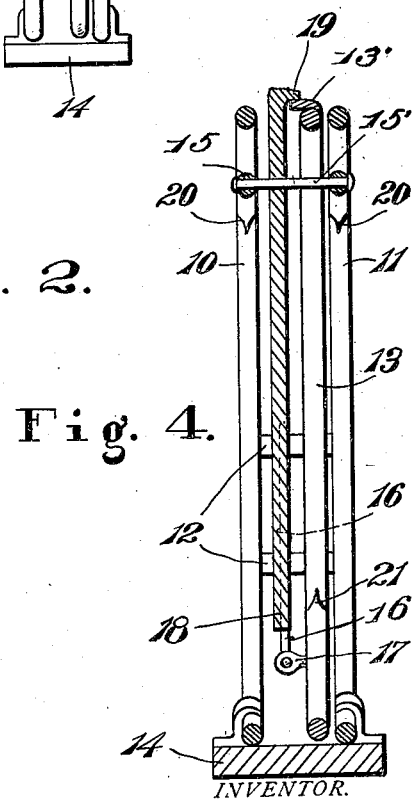
INVENTOR.
David Y. Mosby.
BY
ATTORNEYS

UNITED STATES PATENT OFFICE.

DAVID Y. MOSBY, OF NATIONAL MILITARY HOME, INDIANA.

ANIMAL-TRAP.

1,359,724.   Specification of Letters Patent.   Patented Nov. 23, 1920.

Application filed April 29, 1919. Serial No. 293,408.

*To all whom it may concern:*

Be it known that I, DAVID Y. MOSBY, a citizen of the United States, residing at National Military Home, in the county of Grant, State of Indiana, have invented certain new and useful Improvements in Animal-Traps; and I do hereby declare the following to be a full, clear, and exact description of the invention, such as will enable others skilled in the art to which it appertains to make and use the same.

This invention relates to new and useful improvements in traps and particularly to animal traps.

One object of the present invention is to provide a novel and improved trap which is arranged to be placed in front of the animal's hole so that the animal must pass through the trap and operate the trip to enter or pass from the hole.

Another object is to provide a novel and improved device of this character which is so formed that the animal cannot escape into or out of the hole without releasing the trip and springing the trap with the result that it will be caught.

Other objects and advantages will be apparent from the following description when taken in connection with the accompanying drawing.

In the drawing:

Figure 1 is a front elevation of my improved trap in set position.

Fig. 2 is a similar view showing the trap sprung.

Fig. 3 is a side view of the trap in the position of Fig. 1.

Fig. 4 is an enlarged vertical sectional view taken on the line 4—4 of Fig. 1.

Referring particularly to the accompanying drawing, 10 and 11 represent a pair of rings which are disposed in axial alinement and are secured together in spaced relation, by the bars 12. A third ring 13 is disposed for vertical slidable movement between the rings 10 and 11, as shown in the drawing. The rings 10 and 11 are secured to a base member 14, which may be provided with openings, not shown, for stakes, also not shown, by means of which the device may be anchored in the ground adjacent the hole of the animal to be caught. Extending between the rings 10 and 11, and each having its lower end hooked into engagement with the lower one of the bars 12, are the leaf springs 16, the other or free end of each of the springs being slidably engaged through an eye 17 carried by the ring 13. These springs normally urge the ring 13 upwardly between the rings 10 and 11, as shown in Fig. 2. Pivotally mounted on the pin 15', which is supported at its ends on the horizontal bars 15 formed on chordal lines across the upper portions of the rings 10 and 11, is a trip lever 18, the upper end of said lever being formed with a laterally turned nose 19 for engagement over the projection 13' carried by the central portion of the upper side of the ring 13. Thus when the said nose is engaged with the projection the ring will be held in depressed position against the tension of the springs 16, and when the animal attempts to pass through the rings it will move the lever 18 to one side or the other and disengage said nose 19 from the projection thus permitting the springs to throw the ring 13 upwardly and catch the animal between it and the upper portions of the rings 10 and 11. The lever is so disposed that it must be pushed to one side or the other to permit the animal to pass through the rings, thus rendering the catching of the animal certain. The upper portions of the rings 10 and 11 are formed with the downwardly extending spikes 20, while the lower portion of the ring 13 is provided with the upwardly extending spikes 21, said spikes being arranged to penetrate the animal's body from above and below when caught within the rings, and when the trap is sprung.

To set the trap it is only necessary to push down the ring 13 and engage the nose 19 over the projection 13', when the rings 13 will remain in lowered position between the rings 10 and 11, and against the tension of the springs 16. The trap is then placed directly in front of the hole of the animal so that it must pass through the rings to enter or leave the hole, thus insuring the capture and death of the animal.

What is claimed is:

1. An animal trap including a pair of spaced and axially alined rings having interior spikes, a ring slidable vertically between the first rings and having an interior spike, a pivoted trip lever depending from one of the first rings and across the opening thereof, means on the trip lever for engagement with the intermediate ring to hold the same in lowered set position, and springs carried by one of the first rings and engaged through openings in the intermediate ring for projecting the intermediate ring upwardly when the trip lever is released therefrom by the animal.

2. In an animal trap, the combination with a pair of spaced coaxial rings fixedly mounted in upright position on a base and having bars extending across their upper portions on chordal lines, a pin connecting said bars, and a trip lever pivotally mounted on said pin with its lower end hanging normally across the rings and its upper end deflected into a nose; of a third ring movably mounted between the others, springs urging it normally upward, and a projection at the top of this ring adapted to be engaged under said nose when the trip lever hangs vertical.

In testimony whereof, I affix my signature, in the presence of two witnesses.

DAVID Y. MOSBY.

Witnesses:
MATTHEW TUCKER,
JAMES B. LAYNE.